United States Patent
Kallfass

(10) Patent No.: US 10,597,295 B2
(45) Date of Patent: *Mar. 24, 2020

(54) ORTHO-PHOSPHATE COMPONENTS FOR USE IN SOLID CHEMICAL OXYGEN GENERATORS

(71) Applicant: DIEHL AVIATION GILCHING GMBH, Gilching (DE)

(72) Inventor: Christoph Kallfass, Schwaebisch Hall (DE)

(73) Assignee: Diehl Aviation Gilching GmbH, Gilching (DE)

(*) Notice: Subject to any disclaimer, the term of this patent is extended or adjusted under 35 U.S.C. 154(b) by 148 days.

This patent is subject to a terminal disclaimer.

(21) Appl. No.: 15/858,322

(22) Filed: Dec. 29, 2017

(65) Prior Publication Data

US 2018/0118567 A1 May 3, 2018

Related U.S. Application Data

(63) Continuation of application No. 14/493,821, filed on Sep. 23, 2014, now Pat. No. 9,878,909.

(30) Foreign Application Priority Data

Sep. 23, 2013 (EP) .................................... 13185596

(51) Int. Cl.
*C01B 13/02* (2006.01)

(52) U.S. Cl.
CPC ...... *C01B 13/0218* (2013.01); *C01B 13/0203* (2013.01); *C01B 13/0296* (2013.01)

(58) Field of Classification Search
None
See application file for complete search history.

(56) References Cited

U.S. PATENT DOCUMENTS

| | | | | |
|---|---|---|---|---|
| 3,955,931 A * | 5/1976 | Thompson | ............... | A62B 7/08 422/165 |
| 4,073,741 A | 2/1978 | Heintz | | |
| 4,981,655 A | 1/1991 | Kolbe et al. | | |
| 5,049,306 A * | 9/1991 | Greer | ................ | C01B 13/0218 252/187.1 |
| 5,298,187 A * | 3/1994 | Zhang | ................ | C01B 13/0211 252/187.1 |
| 5,882,545 A * | 3/1999 | Zhang | ................ | C01B 13/0211 252/187.1 |
| 6,126,854 A * | 10/2000 | Zhang | ................ | C01B 13/0211 252/187.1 |
| 2005/0053527 A1* | 3/2005 | Zharkov | ................ | A62B 21/00 422/122 |
| 2009/0062367 A1* | 3/2009 | Czarnik | ............... | C07D 403/06 514/414 |
| 2012/0064397 A1* | 3/2012 | Kallfass | ................. | C01B 25/45 429/202 |
| 2013/0167840 A1* | 7/2013 | Monzyk | .................. | A62B 7/08 128/202.26 |
| 2015/0086470 A1 | 3/2015 | Kallfass | | |

FOREIGN PATENT DOCUMENTS

| | | |
|---|---|---|
| DE | 2605173 A1 | 8/1977 |
| DE | 3039442 A1 | 5/1982 |
| DE | 3725105 A1 | 2/1989 |
| WO | 9317961 A1 | 9/1993 |

OTHER PUBLICATIONS

European Search Report for Application No. 13185596.7-1361 dated Jan. 28, 2014. 5 pages.
F. Camara et al., "I. A New Formula and a New Model for the Arrojadite Structure", American Mineralogist., vol. 91, pp. 1249-1259, 2006, 11 pages.
Meyer M. Markowitz et al., "Lithium Perchlorate Oxygen Candle", I and EC Product Research and Development, vol. 3, No. 4, Dec. 1964, 321-330, 10 pages.
D.V. Yakubovich et al: Crystal Structure of Synthetic Fe3+-Arrojadite with Ideal Formula of K2Na5Fe142+Fe3+[PO4]12(OH)2, Vestnik Moskovskogo Universiteta, Geologiya, vol. 41, No. 1, pp. 36-47, 1986.
William H. Schechter et al., "Chlorate Candles as a Source of Oxygen", Ind. Eng. Chem. 42, 2348 (1950), 6 pages.

* cited by examiner

*Primary Examiner* — Melvin C. Mayes
*Assistant Examiner* — Colette B Nguyen
(74) *Attorney, Agent, or Firm* — Laurence A. Greenberg; Werner H. Stemer; Ralph E. Locher

(57) ABSTRACT

The present invention relates to a composition for generating oxygen, comprising at least one oxygen source selected from chlorates and perchlorates, to an oxygen generator comprising such a composition, and a method for generating oxygen by decomposing such a composition. The present invention further relates to the use of transition metal ortho-phosphate compounds ortho-vanadate compounds and mixed ortho-phosphate-vanadate compounds as multifunctional components in the oxygen generating compositions.

15 Claims, 1 Drawing Sheet

ORTHO-PHOSPHATE COMPONENTS FOR USE IN SOLID CHEMICAL OXYGEN GENERATORS

CROSS REFERENCE TO RELATED APPLICATIONS

This is a continuation of U.S. patent application Ser. No. 14/493,821 filed Sep. 23, 2014, which claims priority to European Patent Application No. 13 185 596.7 filed Sep. 23, 2013, the entire contents of each of which is incorporated herein by reference.

BACKGROUND

The present invention relates to solid compositions for generating oxygen, comprising at least one oxygen source selected from alkali metal chlorates, alkali metal perchlorates, alkaline earth metal chlorates, alkaline earth metal perchlorates and mixtures thereof, to oxygen generators comprising such compositions, to methods for generating oxygen by combusting such compositions, and to the use of specific ortho-phosphate compounds as multifunctional components in such compositions.

Compositions for generating oxygen are required in restricted environments such as submarines or space capsules, or in emergency situations such as in case of sudden pressure drops in aircrafts.

In principle, oxygen generating compositions are known since a long time. Typically, the compositions produce oxygen by thermal decomposition of alkali metal chlorates or perchlorates or alkaline earth metal chlorates or perchlorates. Accessory combustible materials such as carbon or metal powders (serving as fuels, i. e. reducing agents) may be added in order to assist in obtaining the high temperatures required for the decomposition of the chlorates and/or perchlorates. Since the chlorates and/or perchlorates (halogenates (+V, +VII)), in the form of candles, slowly "burn" in the presence of reducing agents, and liberate their oxygen, the compositions are also called "oxygen candles" or "chlorate candles".

Further usual constituents of solid oxygen generating compositions are binders or stabilizers, such as silicates and mica, for influencing the decomposition rate of the oxygen sources and assisting in maintaining structural integrity, additives for suppressing undesired side reactions or for capturing undesired side products, and catalysts such as oxides of various transition metals for speeding up reaction rates or for lowering reaction temperatures, respectively.

The compositions are molten and cast into a desired shape or, usually, press-moulded into powder compacts such as cylindrical rods, tablets, briquettes or other shapes. The shaped composition is placed into a container, and combined with a primer to yield an oxygen generator, which ideally can be easily handled and stored for a quite long time without suffering deterioration.

Once the primer (ignitor) is activated, for example mechanically or electrically, the released energy starts the halogenate decomposition reaction which proceeds without supply of auxiliary power.

Desirably, the oxygen generators shall produce an oxygen stream reliably and continuously over an extended period of time.

Further desirably, the oxygen stream shall be breathable by humans, i. e. essentially free from toxic or otherwise noxious components such as carbon monoxide, carbon dioxide, and chlorine, and shall be provided at a temperature as close to room temperature as possible.

Prior to and during the reaction, the oxygen generating composition should also be in a mechanically stable form in order to avoid any failure during activation (ignition) of the composition, and to avoid interruptions of the oxygen flow, which might result from mechanical alterations of the composition structure induced by external influences, or by modifications of the course of reaction.

A particular problem arises from the fact that in conventional oxygen generators the reaction zone in the burning candle is liquid, due to the high decompositon temperature. Irrespective of the geometrical shape of an oxygen candle, there is always a reaction zone travelling through the candle, starting at the point of ignition. The oxygen generating composition, of course, does not necessarily have the form of a candle, and in the following, the term "candle" means any mould, i.e. shaped part, for example a briquette or tablet.

Depending on the ingredients of a particular oxygen candle, which influence decomposition temperature and melting temperature of the candle, the candle may melt not only in the reaction zone, but also at some distance from the reaction zone. Thus, there is a liquid zone travelling through the candle upon decomposition.

It can be easily understood, that such liquid zone within the otherwise solid candle considerably destabilizes the candle. Mechanical shocks and even slight vibrations tend to separate the unburned portion of a candle from the burned portion, thus interrupting heat transfer, and stopping the decomposition and generation of oxygen.

Various attempts have been made to impart greater structural integrity to the burning candles and their reaction residues in order to render them less sensitive to mechanical influences, and to render them suitable also for operation under zero gravity conditions.

The method of choice used in the prior art is the addition of binders, such as asbestos fibers, infusorial earth, silicious fillers, or fiberglass. The binders also help to avoid extreme volume changes of the candles due to oxygen loss, which is particularly important if an oxygen generator does not contain one single candle, but a plurality of candles in contact with each other. In such an arrangement one burning candle ignites the next candle. Shrinkage of the burnt candle at least deteriorates contact and makes proper decomposition/combustion propagation impossible.

Up to now, however, the problem of destabilization due to localized melting during decomposition, as well as the problem of destabilization as a result of oxygen loss, has not been solved in a satisfactory manner. A further still unsolved problem is the high temperature of the oxygen evolved.

BRIEF DESCRIPTION

It is an object of the present invention to provide a solution to the problems of the prior art outlined above, and in particular to provide a composition for generating oxygen, and an oxygen generator, which produce oxygen reliably and continuously, even under adverse conditions such as in vibrating environments, and preferably at lower temperatures than prior art oxygen generators.

The object is achieved by the composition for generating oxygen, the oxygen generator, the method for generating oxygen, and the use as claimed in the independent claims. Embodiments of the invention are indicated in the respective dependent claims.

The oxygen generator of the invention is an apparatus comprising the composition for generating oxygen of the invention as well as other means and devices essential or advantageous for proper functioning, and conventional per se, for example a containment, an igniting device, means for heat insulation, filter layers for retaining particulates, etc. Reference is made to DE 30 39 442 A1 and DE 37 25 105 A1 showing exemplary oxygen generators.

The oxygen generating composition of the present invention is typically provided in the form of powder compacts, such as press-moulded rods, pellets, sheets, tablets and briquettes, however, the morphological shape and structure is not limited in any particular manner. For example, the composition may be formed into tablets having different oxygen production capacities achieved by zones of different reaction velocities as described in DE 37 25 105 A1. Further, as described in this document, the tablets may be contained in the oxygen generator container in bulk form, and intimate contact between tablets may be maintained, for example, by a tension member such as a pressure spring.

The oxygen generating composition, on the one hand, contains components conventional in such compositions, namely oxygen sources, and optionally fuels, and various auxiliary agents. Oxygen sources are halogenates, i. e. chlorates, perchlorates, and mixtures of chlorates and perchlorates of alkali metals or alkaline earth metals or mixtures thereof. Preferably, the oxygen sources are chlorates and/or perchlorates of lithium, sodium, potassium, and mixtures thereof. Particularly preferred are chlorate and perchlorate of sodium. Sodium perchlorate is the most preferred oxygen source.

As fuels various metals in powder form can be advantageously used. The fuels act as reducing agents, and are oxidized to metal oxides, thus providing additional energy for supporting the decomposition. Exemplary fuels are fine powders of aluminium, iron, magnesium, manganese, silicon, and titanium, and non-metals such as boron and carbon may also be used.

Among auxiliary agents advantageously included in the oxygen generating composition, barium peroxide, and the oxide, peroxide and hydroxide of alkali metals shall be specifically mentioned. These compounds serve for binding chlorine and carbon dioxide, which are sometimes produced in trace amounts, but should not be present in breathable oxygen.

For an overview over exemplary compositions, reactions and problems associated with oxygen generators, reference is made to M. M. MARKOWITZ, D. BORYTA, H. STEWART: Lithium Perchlorate Oxygen Candle, I and EC Product Research and Development, Vol. 3, No. 4, December 1964, 321-330 and W. H. SCHECHTER, R. R. MILLER, R. M. BOVARD, C. B. JACKSON, J. R. PAPPENHEIMER, Chlorate Candles as a Source of Oxygen, Ind. Eng. Chem. 42, 2348 (1950).

On the other hand, the oxygen generating composition contains components, known per se, but not heretofore used in oxygen generating compositions. Namely, the composition of the present invention contains specific phosphates, vanadates or mixed phosphate-vanadates, which replace, at least in part, conventional binders and catalysts. The phosphates, vanadates and mixed phosphate-vanadates are multifunctional in that they serve both as binders and as catalysts. In one embodiment, the compositions do not contain any binders and/or catalysts in addition to the multifunctional components, although the presence of conventional binders, such as silicates or mica, and/or conventional catalysts, such as oxides of iron, cobalt or manganese, in addition to the multifunctional components, is not excluded.

Phosphates, vanadates and mixed phosphate-vanadates suitable as multifunctional components in accordance with the present invention are the respective ortho-compounds of transition metals, for example of titanium, vanadium, chromium, manganese, iron, cobalt, nickel, copper, zinc, but other transition metals are also suitable. The multifunctional components may contain one or more transition metal(s). In addition, the multifunctional components contain at least one alkali metal and/or at least one alkaline earth metal, for example at least one of lithium, sodium, potassium, magnesium, calcium, strontium and barium. Optionally, other cations and/or anions may be present, for example aluminum ions, hydroxyl ions, or halide ions. Particularly preferred are ortho-phosphates comprising lithium and at least one of manganese, iron and cobalt.

Surprisingly, these compounds act as binders and facilitate the decomposition of alkali metal and alkaline earth metal chlorates and perchlorates, i.e. catalyse the decomposition of these halogenates. Thus, they can replace both conventional binders and conventional catalysts at the same time.

Some of the multifunctional compounds are transformed into different compounds during the decomposition reaction, while others are not.

It has been observed that those which remain unchanged are mineral or synthetic compounds belonging to the arrojadite group. Mineral and synthetic compounds belonging to the arrojadite group, i.e. arrojadites, are transition metal ortho-phosphates having a structure with open channels. Both mineral and synthetic members of the arrojadite group serve the dual purpose of stabilizing the composition and catalysing the decomposition of the halogenates. For an overview over arrojadite compounds, reference is made to O. V. Yakubovich et al.: Crystal Structure of Synthetic $Fe^{3+}$-Arrojadite with Ideal Formula of $K_2Na_5Fe14_2+Fe_3+[PO_4]_{12}(OH)_2$, Vestnik Moskovskogo Universiteta, Geologiya, Vol. 41, No. 1, pp. 36-47, 1986, and to F. Camara et al.: The arrojadite enigma: I. A new formula and a new model for the arrojadite structure, American Mineralogist, Vol. 91, pp. 1249-1259, 2006.

The other multifunctional compounds are ortho-phosphates different from arrojadites, and ortho-vanadates and mixed ortho-phosphate-vanadates. While these compounds may be, in principle, of mineral nature, they are typically synthetic compounds. Therefore, they are referred to here as "synthetic compounds". These synthetic compounds, like arrojadites, serve as binders. Unlike mineral or synthetic members of the arrojadite group, however, the synthetic compounds do not constitute catalysts in a conventional sense. Catalysts as usually understood in the art are not changed as a result of their catalytic actions. The synthetic compounds, however, both participate in the process of decomposition and catalyse the process. In addition, they form catalysts in situ. The catalysts formed in situ are identical to those conventionally used, i. e. transition metal oxides.

The multifunctional compounds used according to the present invention provide distinct advantages when incorporated into oxygen generating compositions. In the presence of the multifunctional compounds, the process of decomposition proceeds without formation of a liquid phase. That is, while a reaction zone travels through a "burning" candle, no liquid zone travels through the candle. Any localized melting of the composition cannot be observed.

The lack of any liquid phase formation provides enhanced mechanical stability and improved chemical reaction control as compared to prior art oxygen candles. Candles, or other shaped parts, according to the present invention are less susceptible to external influences, for example shocks, or shaking or tilting an oxygen generator during use. Separation of used portions from unused portions of a candle at their liquid interfaces is avoided due to a lack of such liquid interfaces, thus avoiding interruption of decomposition/combustion, and reliably providing a continuous and enduring oxygen flow.

The candles, or other shaped parts, substantially maintain their sizes and shapes during use, although they release considerable amounts of their chemically bound oxygen, due to oxygen liberation in gaseous form. Therefore, while in prior art candles the morphological structure breaks down during use of a candle, i. e. the reaction residues have a remarkable smaller volume than the starting compositions, in candles according to the present invention the structure remains substantially intact. What can be observed is an increase of porosity, i. e. a used candle has more pores and larger pores than a pristine candle.

The structural stability also reduces contact problems in oxygen generator embodiments using a series of candles, or candles (tablets, pellets) in bulk form. Once the reaction zone has completely travelled through a candle within a plurality of candles, the heat of reaction evolved by the first candle can be used for activating, i. e. igniting, a neighbouring candle or neighbouring candles. Consequently, reaction reliable jumps from one candle across an adjacent one, thus also contributing to continuous and enduring oxygen evolution.

The reaction proceeds at lower reaction temperatures and produces less reaction heat than with prior art catalysts. As a result, the oxygen liberated from the compositions of the present invention is at a somewhat lower temperature, and thus more suitable for physiological use.

In addition, the inventive use of the multifunctional components yields substantially pure oxygen, i. e. the oxygen produced is essentially free from any noxious side products, for example chlorine.

Among the numerous members of the arrojadite group, KNa4CaMn4+2Fe10+2Al(PO4)12(OH, F)2 works particularly well.

Among the multifunctional compounds not belonging to the arrojadite group (ortho-phosphates, ortho-vanadates and mixed ortho-phosphate-vanadates of typically synthetic origin), Li3Fe2(PO4)3 is most preferable. Upon heating with sodium perchlorate in air, Li3Fe2(PO4)3 reacts with sodium perchlorate, forming inter alia LiNaPO4, Fe(PO4)3, Na4(FeO3), NaCl and oxygen at temperatures above 420° C. At the beginning of the decomposition reaction, Li3Fe2(PO4)3 does not constitute a catalyst in a conventional sense, but a reaction participant. Nevertheless it performs like a catalyst in that it facilitates liberation of oxygen from the oxygen source. Upon further temperature increase to a range between 440° C. and 450° C., the iron containing compounds form LiFePO4 and Fe2O3. Fe2O3 is a conventional catalyst for the perchlorate/chlorate decomposition reaction. In the temperature range from 440° C. to 450° C. the decomposition of sodium perchlorate to sodium chloride is completed, catalysed by Fe2O3.

In the formula Li3Fe2(PO4)3, lithium can be replaced by a different alkali metal and/or an alkaline earth metal, preferably by sodium or potassium. Preferably lithium is only partly replaced, e.g. up to about 95% or at most 98% of the molar content of lithium are replaced. Alternatively, or in addition, all or a part of iron may be replaced by a different transition metal, preferably by manganese and/or cobalt. The manganese and/or cobalt containing phosphates form, upon reaction with chlorates and/or perchlorates, inter alia various manganese oxides and cobalt oxides, respectively, which are effective conventional catalysts for the chlorate and perchlorate decomposition reactions.

Alternatively, or in addition, all or a part of phosphor may be replaced by vanadium, resulting in vanadates and mixed phosphate-vanadates. Phosphates are preferable over vanadates in particular under cost aspects and environmental aspects.

The compounds wherein all or a part of lithium and/or all or a part of iron and/or all or a part of phosphor is replaced all facilitate decomposition of the chlorate and/or perchlorate oxygen sources. Therefore, they may be regarded as catalysts, although they are not catalysts in the sense as this term is generally used, because they are transformed into different compounds during the reaction.

The phosphates and/or vanadates are ortho-phosphates and ortho-vanadates, respectively. The corresponding condensed compounds perform in a similar manner, however, when using condensed phosphates and/or vanadates, the oxygen produced also contains chlorine.

DETAILED DESCRIPTION

Figure 1A:
FIGS. 1, 1A, 1B, and 1C are graphs showing the reaction heat and progress of the thermal decomposition of sodium perchlorate in air, using different catalysts.
Figure 1B:
Figure 1C:
Figure 1:
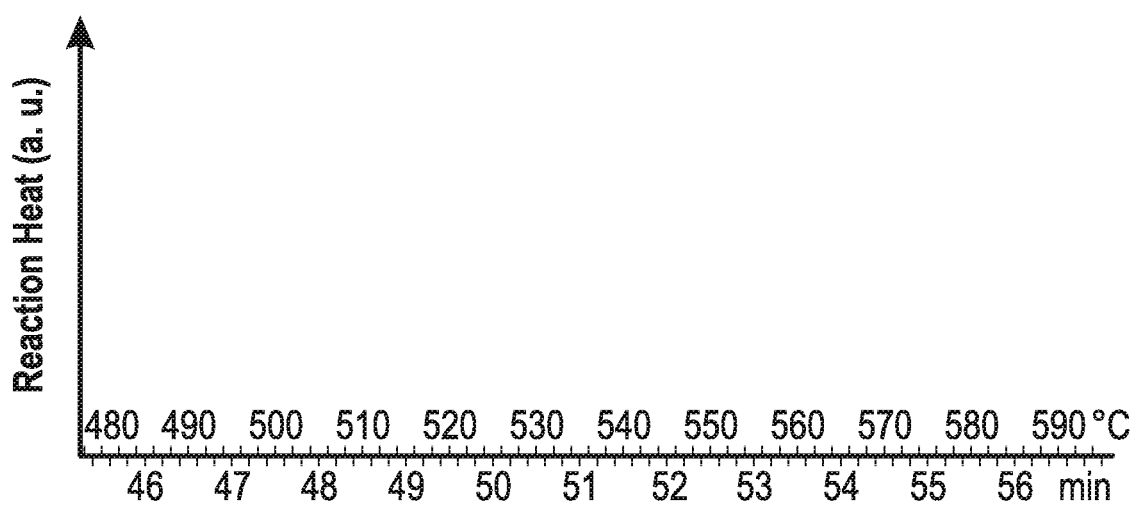

The advantages of the inventive use of multifunctional components in oxygen generating compositions are further illustrated by the Figures. FIG. 1A illustrates the decomposition of sodium perchlorate without any catalyst, i.e. pure sodium perchlorate. FIG. 1B illustrates the decomposition in the presence of Mn2O3 as a catalyst, and FIG. 1C illustrates the decomposition in the presence of arrojadite as a catalyst. The reaction heat developed in these reactions has been determined by TG/DSC-measurements recorded with a heating rate of 10 K/min in the temperature range from 20° C. to 650° C. There is a temperature difference between the measured temperature, indicated at the abscissa, and the reaction heat evolved from the sample, i.e. the sample "lags behind". In all cases, the amount of sodium perchlorate was 15.0 mg, and the measurement conditions were identical. Therefore, the results obtained can be compared. The respective decomposition temperatures have been determined separately by in situ powder diffraction measurements.

The decomposition of pure sodium perchlorate takes place in the temperature range from 440° C. to 450° C., and the reaction heat released is 7019 mJ, the decomposition in the presence of manganese oxide as a catalyst takes place in the temperature range from 360° C. to 450° C., and the reaction heat released is 6563 mJ, whereas in the presence of arrojadite as a catalyst the decomposition starts at about 300° C., and is nearly complete in the temperature range from 440° C. to 450° C. The reaction heat released is 5582 mJ, i. e. in the decomposition reaction with arrojadite as a catalyst approximately 15% less reaction heat is released than in the decomposition with manganese oxide as a catalyst. The arrojadite used here was KNa4CaMn4+2Fe10+2(Al(PO4)12(OH,F)2.

Examination of the reaction products reveals, that the decomposition of pure sodium perchlorate yields sodium chloride in the form of a solidified melt, the decomposition in the presence of manganese oxide yields a similar product, while the decomposition in the presence of arrojadite yields a pulverulent product. The pulverulent product can be easily removed from the sample holder without any mechanical aids. In the other cases, the reaction products cannot be easily removed from the sample holder, but must be abraded.

The result proves that with arrojadite as a catalyst, the decomposition of sodium perchlorate proceeds at comparatively low temperature, produces a comparatively small amount of reaction heat, and the constituents remain in the solid state throughout the reaction. In an oxygen candle, no liquid phase is formed when sodium perchlorate is decomposed in the presence of arrojadite, and no destabilisation of the candle occurs.

A similar result is obtained, when sodium perchlorate is heated up in air in the presence of $Li_3Fe_2(PO_4)_3$ instead of in the presence of arrojadite. Here, oxygen evolution starts at about 420° C., and is complete at about 450° C., and the reaction residue is pulverulent and can be removed from the sample holder easily. Therefore, it can be concluded that no liquid phase appeared during the decomposition process.

The lack of formation of a liquid phase in the presence of arrojadite or $Li_3Fe_2(PO_4)_3$ is also proved by dilatometer tests. Moulds comprising sodium perchlorate and arrojadite or sodium perchlorate and $Li_3Fe_2(PO_4)_3$, respectively, maintain their dimensions during and after decomposition of sodium perchlorate. In contrast, moulds comprising pure sodium perchlorate or sodium perchlorate and $Mn_2O_3$ deform, due to melting.

Powder diffractograms of compositions comprising sodium perchlorate and arrojadite, and sodium perchlorate and $Li_3Fe_2(PO_4)_3$, respectively, confirm that arrojadite is not changed during the decomposition of sodium perchlorate, while $Li_3Fe_2(PO_4)_3$ is transformed, mainly, into $Fe_2O_3$ and $Li_3FePO_4$. Despite the transformation, however, no melting or other destabilization could be observed. Both the mineral arrojadite and the synthetic transition metal ortho-phosphate effectively prevented melting during the decomposition of sodium perchlorate. Other arrojadites and synthetic transition metal ortho-phosphates different from arrojadites, as well as ortho-vanadates and ortho-phosphate-vanadates, behave similarly.

This finding is used in the present invention for providing oxygen generators superior in resistivity against mechanical influences, and superior in reliability and endurance of oxygen formation.

What is claimed is:

1. An oxygen generator comprising a composition for generating oxygen by a self-sustaining decomposition, a container for containing the oxygen generating composition, and a primer for starting decomposition of the oxygen generating composition, wherein the oxygen generating composition comprises at least one oxygen source selected from alkali metal chlorates, alkali metal perchlorates, alkaline earth metal chlorates, alkaline earth metal perchlorates and mixtures thereof, characterized in that the composition further comprises at least one compound selected from transition metal ortho-phosphates, transition metal ortho-vanadates and mixtures thereof, wherein the at least one ortho-phosphate, ortho-vanadate or ortho-phosphate-vanadate contains at least one alkali metal and/or at least one alkaline earth metal.

2. The oxygen generator of claim 1, characterized by comprising an ortho-phosphate or a mixed ortho-phosphate-vanadate of at least one transition metal, at least one alkali metal and/or at least one alkaline earth metal.

3. The oxygen generator of claim 1, characterized by comprising an ortho-phosphate of two or more metals, the metals comprising at least lithium and iron in the oxidation state +3.

4. The oxygen generator of claim 1, characterized by comprising $Li_3Fe_2(PO_4)_3$.

5. The oxygen generator of claim 1, characterized by comprising an arrojadite.

6. The oxygen generator of claim 5, characterized in that the arrojadite comprises manganese and/or iron.

7. The oxygen generator of claim 1, characterized by further comprising at least one fuel.

8. The oxygen generator of claim 1, characterized by further comprising at least one auxiliary agent suitable for suppressing undesired side reactions or for capturing undesired side products.

9. The oxygen generator of claim 1, characterized in that the composition is in the form of one or more shaped parts.

10. The oxygen generator of claim 1, characterized in that the composition is in the form of a single oxygen candle, a plurality of oxygen candles arranged in series, or a tabletted fill in bulk form.

11. A method of using the oxygen generator of claim 1, comprising decomposing said oxygen generating composition to generate oxygen.

12. The method of use of claim 11, wherein the transition metal ortho-phosphate, transition metal ortho-vanadate or mixture thereof is multifunctional in that it both acts as a binder and facilitates decomposition of the oxygen source.

13. The method of use of claim 11, characterized in that the transition metal ortho-phosphate, transition metal ortho-vanadate or mixture thereof emerges unchanged from the process of decomposition.

14. The method of use of claim 11, characterized in that the transition metal ortho-phosphate, transition metal ortho-vanadate or mixture thereof is transformed to a different compound in the process of decomposition.

15. The method of use of claim 11, characterized in that melting or localized melting of the composition during decomposition is avoided by inclusion of the transition metal ortho-phosphate compound, or transition metal ortho-vanadate compound, or mixture thereof.

* * * * *